(12) United States Patent
Robinson et al.

(10) Patent No.: US 10,228,967 B2
(45) Date of Patent: Mar. 12, 2019

(54) NON-REPUDIABLE TRANSACTION PROTOCOL

(71) Applicant: Red Hat, Inc., Raleigh, NC (US)

(72) Inventors: Paul Robinson, Whitley Bay (GB); Thomas Jenkinson, Leeds (GB)

(73) Assignee: Red Hat, Inc., Raleigh, NC (US)

(*) Notice: Subject to any disclaimer, the term of this patent is extended or adjusted under 35 U.S.C. 154(b) by 253 days.

(21) Appl. No.: 15/170,407

(22) Filed: Jun. 1, 2016

(65) Prior Publication Data

US 2017/0351542 A1    Dec. 7, 2017

(51) Int. Cl.
*G06F 9/46* (2006.01)

(52) U.S. Cl.
CPC .................................. *G06F 9/466* (2013.01)

(58) Field of Classification Search
None
See application file for complete search history.

(56) References Cited

U.S. PATENT DOCUMENTS

| | | | |
|---|---|---|---|
| 7,500,096 B2 | 3/2009 | Lang et al. | |
| 8,171,293 B2 | 5/2012 | Sudhakar | |
| 8,528,097 B2 | 9/2013 | Ginter et al. | |
| 2002/0029200 A1* | 3/2002 | Dulin ...................... | G06F 21/33 705/67 |
| 2004/0073790 A1 | 4/2004 | Ateniese et al. | |
| 2004/0186912 A1* | 9/2004 | Harlow .................. | G06Q 20/40 709/237 |
| 2012/0179784 A1 | 7/2012 | Picconi et al. | |
| 2014/0341139 A1* | 11/2014 | Hu ........................ | H04L 5/0044 370/329 |
| 2014/0351139 A1 | 11/2014 | Mizrah | |
| 2016/0294726 A1* | 10/2016 | Parkinson ......... | G06F 17/30371 |

FOREIGN PATENT DOCUMENTS

| | | |
|---|---|---|
| WO | 2001/025883 A2 | 4/2001 |
| WO | 2001/030016 A2 | 4/2001 |

OTHER PUBLICATIONS

Coffey et al, Non-repudiation with mandatory proof of receipt, University of Limerick, Ireland, 1996, 12 pages.*

(Continued)

*Primary Examiner* — Diem K Cao
(74) *Attorney, Agent, or Firm* — K&L Gates LLP

(57) ABSTRACT

A non-repudiable transaction protocol system includes a memory, at least one processor in communication with the memory, an operating system executing on the at least one processor, a resource manager configured to manage a storage system, and a transaction manager. The transaction manager is configured to provide NRO-W evidence of a work request from a client to the resource manager and provide NRR-W evidence to the client that the resource manager has completed initial work for the work request. Additionally, the transaction manager is configured to provide NRO-C evidence to the resource manager that the client requested completion of the initial work and NRR-C evidence to the client that the resource manager promised to execute the completion. Each of the NRO-W evidence, the NRR-W evidence, the NRO-C evidence, and the NRR-C evidence are exchanged to prevent either one of the client and the resource manager from gaining an advantage.

20 Claims, 7 Drawing Sheets

(56) References Cited

OTHER PUBLICATIONS

Blixt et al, Adding Non-Repudiation to Web Transactions, Applied Network Security, Jun. 1999, 19 pages.*
Zhou et al, Evidence and non-repudiation, Journal of network and computer applications, Academic Press Limited, 1997, 15 pages.*
Cook, et al., "Distributed Object Middleware to Support Dependable Information Sharing between Organisations," 2001.
Cook, et al., "Distributed object middleware to support dependable information sharing between organisations," International Conference on Dependable Systems and Networks, 2002.
Cook, et al., "Middleware Support for Non-repudiable Transactional Information Sharing between Enterprises," 2003.
Robinson, et al., "Implementing Fair Non-Repudiable Interactions with Web Services," Ninth IEEE International EDOC Enterprise Computing Conference, Sep. 2005.
Cook, "Middleware Support for Non-repudiable Business-to-Business Interactions," 2007.
Su Rui-dan, et al., "Achieving Fair Non-Repudiation for Web Services Transaction," Jan. 2010, accessed from http://www.researchgate.net/publication/251936997_Achieving_fair_non-repudiation_for_web_services_transaction, on or before Jan. 27, 2015.
Klay, et al., "Automatic Methods for Analyzing Non-Repudiation Protocols with an Active Intruder," France Telecom R&D, Lannion, France; LORIA—Nancy Universite, Vandoeuvre-les-Nancy, France, accessed from http://www.avantssar.eu/pdf/publications/paperKV-FAST08.pdf, on or before Jan. 27, 2015.
"Non-Repudiation," accessed from http://www.cse.scu.edu/~tschwarz/coen351_05/PPtPre/Nonrepudiation.ppt, on or before Jan. 27, 2015.
Santiago, et al., "Study for Automatically Analysing Non-repudiation," LORIA—INRIA-UN2 (UMR 7503) BP 239, 54506 Vandœuvre-les-Nancy Cedex, France, accessed from http://www.avispa-project.org/papers/SantiagoV-CRiSIS05.pdf, on or before Jan. 27, 2015.

* cited by examiner

NON-REPUDIABLE TRANSACTION PROTOCOL

BACKGROUND

Transactions may include operation or work items that are performed in a distributed fashion by multiple nodes, and may often be implemented on multiple networked computer systems. Transactions arise in a number of different contexts some of which involve evidence of work items involved to complete the transaction. For example, business travel, vacation bookings, itinerary planning, and event reservations may involve a transaction with work items performed by nodes at a number of individual computer systems. For example, booking travel may involve a transaction that requires multiple different parties processing the transaction at different nodes. A travel agent system node may request reservations on various flights, hotels, etc. In response to the requests, one or more airline system nodes may book flight tickets for a traveler. One or more hotel system nodes may create reservations for the traveler, etc.

SUMMARY

The present disclosure provides new and innovative systems and methods of non-repudiable transaction protocols. In an example embodiment, a system includes a memory, at least one processor in communication with the memory, an operating system executing on the at least one processor, at least one resource manager configured to manage a storage system, and a transaction manager. The transaction manager is configured to provide non-repudiation of origin-work (NRO-W) evidence of a work request from a client to the at least one resource manager. The transaction manager receives the work request from the client, and the NRO-W evidence is provided to the resource manager immediately after non-repudiation of receipt-work (NRR-W) evidence is provided to the transaction manager. The transaction manager is further configured to provide the NRR-W evidence to the client that the at least one resource manager has completed initial work for the work request. Additionally, the transaction manager is configured to provide non-repudiation of origin-completion (NRO-C) evidence to the at least one resource manager that the client requested completion of the initial work. The transaction manager is also configured to provide non-repudiation of receipt-completion (NRR-C) evidence to the client that the at least one resource manager promised to execute the completion. Each of the NRO-W evidence, NRR-W evidence. NRO-C evidence, and NRR-C evidence are exchanged to prevent either one of the client and the resource manager from gaining an advantage.

In an example embodiment, a computer-implemented method for coordinating a transaction by a transaction manager executed by at least one processor includes providing, by the transaction manager, non-repudiation of origin-work (NRO-W) evidence of a work request from a client to a resource manager. The transaction manager receives the work request from the client. The NRO-W evidence is provided to the resource manager immediately after non-repudiation of receipt-work (NRR-W) evidence is provided to the transaction manager. The method further includes providing, by the transaction manager, the NRR-W evidence to the client that the resource manager has completed initial work for the work request The transaction manager provides non-repudiation of origin-completion (NRO-C) evidence to the resource manager that the client requested completion of the initial work, and provides non-repudiation of receipt-completion (NRR-C) evidence to the client that the resource manager promised to execute the completion. Each of the NRO-W evidence, the NRR-W evidence, the NRO-C evidence, and the NRR-C evidence are exchanged to prevent either one of the client and the resource manager from gaining an advantage.

In an example embodiment, a non-transitory machine readable medium storing a program, which when executed by a processors, causes a transaction manager to provide non-repudiation of origin-work (NRO-W) evidence of a work request from a client to the at least one resource manager. The transaction manager receives the work request from the client, and the NRO-W evidence is provided to the resource manager immediately after non-repudiation of receipt-work (NRR-W) evidence is provided to the transaction manager. The non-transitory machine readable medium also causes the transaction manager to provide the NRR-W evidence to the client that the at least one resource manager has completed initial work for the work request. Additionally, the non-transitory machine readable medium causes the transaction manager to provide non-repudiation of origin-completion (NRO-C) evidence to the at least one resource manager that the client requested completion of the initial work, and provide non-repudiation of receipt-completion (NRR-C) evidence to the client that the at least one resource manager promised to execute the completion. Each of the NRO-W evidence, the NRR-W evidence, the NRO-C evidence, and the NRR-C evidence are exchanged to prevent either one of the client and the resource manager from gaining an advantage.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
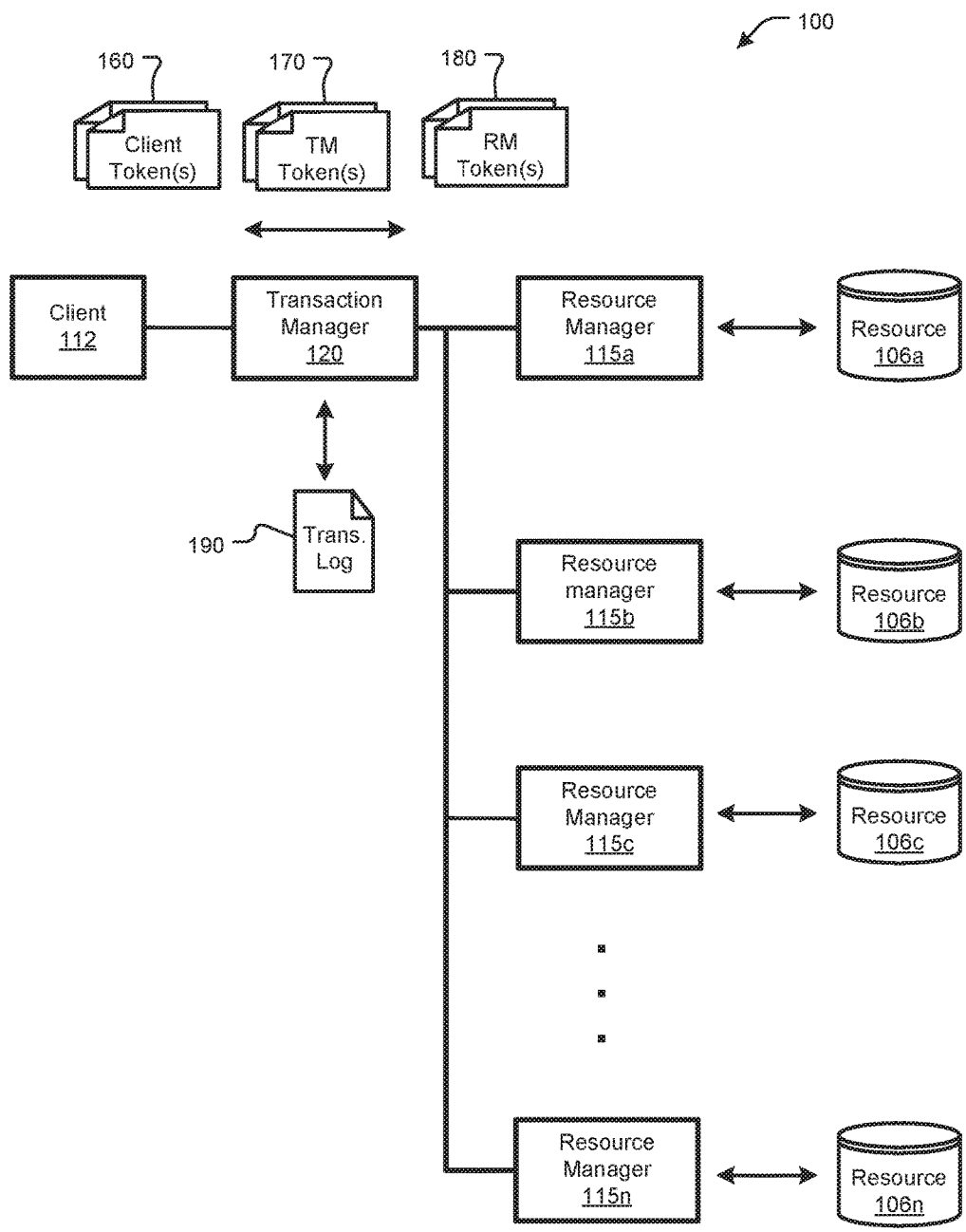
FIG. 1 illustrates an example of an environment for implementing a non-repudiable transaction protocol according to an example embodiment of the present disclosure.

Techniques and examples are disclosed for systems and methods for executing non-repudiable transaction protocols. Transactions may be executed according to any suitable transaction protocol. As described herein, a transaction may be a compensating transaction, a distributed transaction, a long-running transaction, a saga transaction, etc. Non-repudiation is an aspect of security that is concerned with the creation of irrefutable audits of an interaction. Non-repudiation is the inability of a principal to refute an action within a given context. In practice, non-repudiation is typically concerned with the sending of a message from one principal to another. Non-repudiation ensures an originator (A) of the message cannot deny sending it and a recipient (B) of the message cannot deny receiving the message. Non-repudiation is achieved by generating evidence at various points during the transmission of a message. As described herein, to prevent the evidence from being refuted, the evidence is digitally signed by the originator.

To achieve non-repudiation, party A may generate evidence for non-repudiation of the message's origin. On party B's receipt of the message, party B may generate evidence for non-repudiation of receipt for the message. It is generally important that party A receives the non-repudiation of receipt evidence and that party B receives both the non-repudiation of origin evidence and the message. These evidences may be required to prove that the message was sent by party A and received by party B, during the interaction, to a trusted third party in case of a dispute. An unfair situation may arise if one party (e.g., party B) receives their evidence and the other party (e.g., party A) does not. Assume party B receives evidence of non-repudiation of origin, but party A does not receive the evidence for non-repudiation of receipt. In this scenario, party B may repudiate receiving the message from party A because party A cannot prove that the message was received. To prevent unfair situations a fair non-repudiation protocol may be used to ensure that either both parties obtain their expected items or neither does. However, it is not enough for both parties to simply exchange these items with each other because the first party to hand over their items may be at a disadvantage as the other party may choose not to reciprocate. For example, if party A sends the message to party B and party A is the first party to send the non-repudiation of origin evidence to party B, party B may choose to not send the non-repudiation of receipt evidence to party A, and party A would have no evidence that B ever received the message. Therefore, a trusted third party may facilitate a fair exchange. The trusted third party may time-stamp all the evidences it receives. Otherwise a party can simply revoke their certificate and claim that the evidence was created (by someone else) after revocation.

Current transaction protocols generally assume honesty of all the parties in the interaction. Therefore, it may be very difficult to prove after the fact what had happened in the protocol. The techniques described herein disclose utilizing the transaction manager as a delivery agent style trusted third party and also demonstrate how a non-repudiation protocol can be integrated into a transaction protocol. Much of the present disclosure is compatible with and/or may be implemented using the Robinson Cook Shrivastava (RCS) protocol, however, the techniques and methods discussed herein are not limited to the RCS protocol and may be applied to several other non-repudiation protocols.

In various examples, a transaction manager of a transaction may also act as a trusted third party (TPP) between the client that requested the transaction and one or more resource managers for performing work items making up the transaction. The client and the one or more resource managers may generate digitally signed tokens at various stages of a transaction. The client and resource manager(s) may provide the tokens to the transaction manager in the course of the transaction. The transaction manager may log the tokens and/or release the tokens to the opposite party upon confirmation that the party either has or will continue with the transaction. The client and the various resource managers may use the tokens as proof of the state of the transaction at the various stages.

FIG. 1 depicts a high-level component diagram of an example of an environment for implementing a non-repudiable transaction protocol according to an example embodiment of the present disclosure. FIG. 1 is a diagram showing one example of an environment 100 for implementing non-repudiable transactions. A client 112 may request the transaction, as described herein. The request may be directed to a transaction manager 120. The transaction manager 120 may coordinate the transaction while also acting as a trusted third party (TIP) for the storing and distributing various non-repudiation tokens 160, 170, 180. Upon receiving a request for a transaction, the transaction manager 120 may enroll one or more participating resource managers 115a-n. Each resource manager 115a-n may be enrolled to perform one or more work items that are part of transaction. For example, each resource manager 115a-n may have access to perform one or more work items on a corresponding transaction resource 106a-n. Resources 106a-n may be any type of resources, such as resources having a state that can be manipulated. Examples of resources may include data files, databases, database tables, messaging systems, language level resources, etc. Any suitable number of resource managers 115a-n and resources 106a-n may be used, for example, based on the nature of the transaction.

During the transaction, the resource managers 115a-n may execute their assigned work item or work items on the resources 106a-n. At various stages in the transaction, the client 112, the transaction manager 120, and the resource managers 115a-n each may generate one or more digitally signed non-repudiation tokens 160, 170, 180. Non-repudiation tokens 180 created by the resource managers 115a-n and/or non-repudiation tokens 160 created by the client 112 may be provided to the transaction manager 120. In its role as the trusted third party, the transaction manager 120 may store tokens 160, 170, 180 in a transaction log 190. Also, at various stages of the transaction, the transaction manager 120 may provide the client 112 and/or the resource managers 115a-n with one or more non-repudiation tokens 160, 170, 180, as described herein. For example, the resource managers 115a-n may be provided with non-repudiation tokens 160 generated by the client 112 and/or non-repudiation tokens 170 generated by the transaction manager 120. The client 112 may be provided with non-repudiation tokens 170 generated by the transaction manager 120 and/or non-repudiation tokens 180 generated by the resource managers 115a-n. The parties to the transaction (e.g., the client 112 and the resources managers 115a-n) may use the non-repudiation tokens to prove the state of the transaction at the various stages. For example, the parties may use the tokens 160, 170, 180 to demonstrate that their actions during the transaction were in response to valid messages actually sent by the other party. This may prevent parties to the transaction from falsely repudiating a message or instruction actually sent. Whether or not tokens 160, 170, 180 are provided to the parties, the transaction manager 120 may store the tokens at a transaction log 190 that may be made available to the parties if it becomes necessary to prove a state of the transaction. The transaction manager 120 may sign and/or timestamp entries to the transaction log 190. This may allow the various parties, or third parties, to cross-reference a trusted time when a token 160, 170, 180 was provided with a certificate authority 117 shown in FIG. 2 and described further below.

The non-repudiation tokens 160, 170, 180 may be generated in any suitable manner. In some examples, the non-repudiation tokens may be created using public/private key pairs. For example, the client 112, resource managers 115a-n and/or transaction manager 120 may create non-repudiation tokens 160, 170, 180 by digitally signing a unit of data (e.g., an instruction or message) with the creator's private key. Other parties may verify a non-repudiation token by decrypting the token with the public key of the creator. For example, the parties (e.g., client 112, resource managers 115a-n, and/or transaction manager 120) may register their public keys with a certificate or certification authority 117. Parties that want to verify a non-repudiation token may obtain the creator's private key from the certificate authority 117. For example, the client 112, the resource managers 115a-n and, in some examples, the transaction manager 120 may have public keys registered with a certificate authority 117 and may generate tokens by encrypting (or signing) data with the corresponding private keys.

Figure 2:
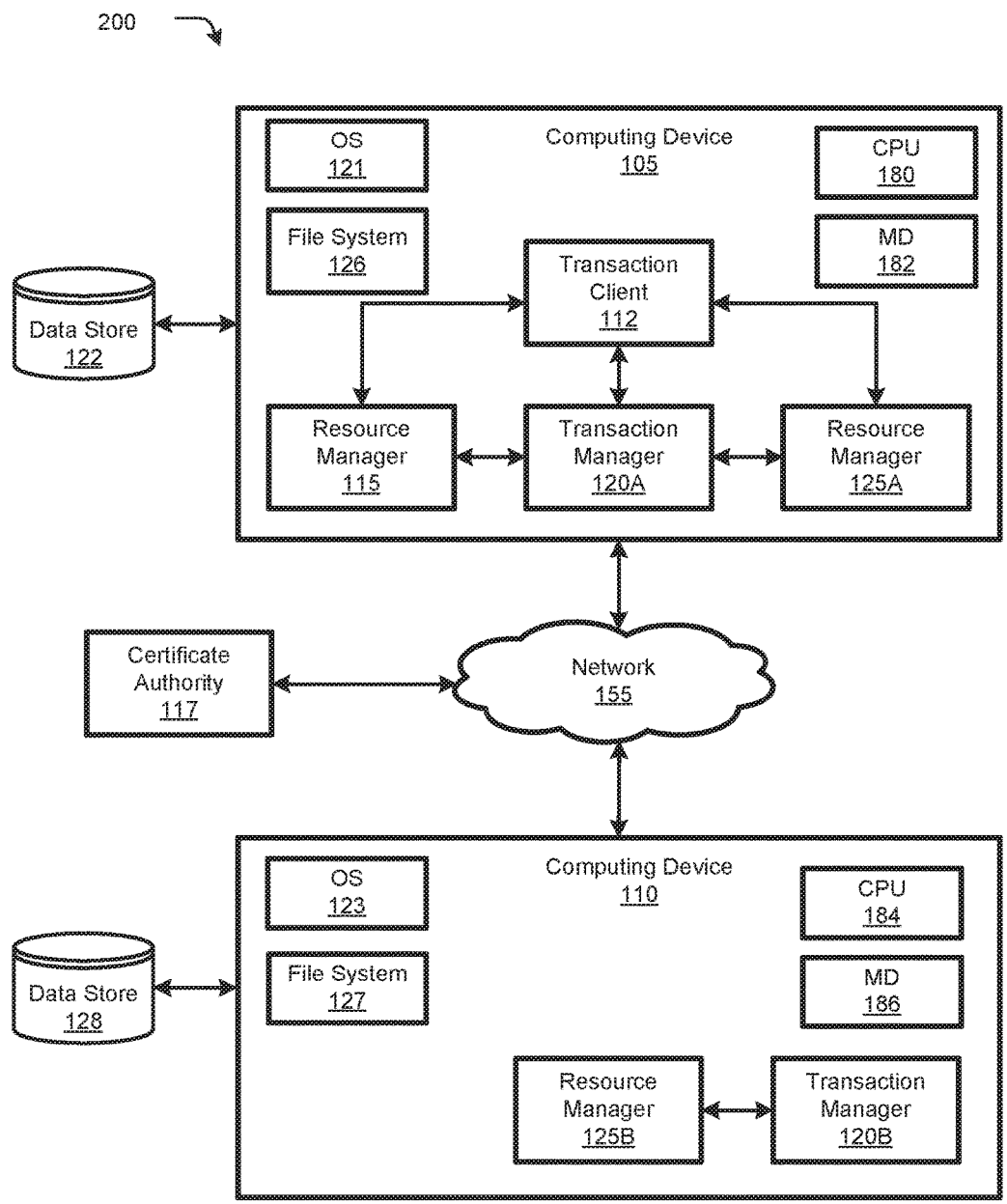
FIG. 2 illustrates an example of a computing system that may execute various components of a non-repudiable transaction protocol according to an example embodiment of the present disclosure.

FIG. 2 shows an example of a computing system that may execute various components of a non-repudiable transaction protocol according to an example embodiment of the present disclosure. For example, the computing system 200 may execute the transaction manager 120, participating resource managers 115a-n and other components described herein. The computing system 200 may include one or more computing devices 105, 110. The computing devices 105, 110 may include any suitable type of computing device or machine that has a programmable processor including, for example, one or more servers, one or more desktop computers, one or more laptop computers, one or more routers, etc. In some examples, one or both of the computing devices 105, 110 may include a single machine or may include multiple interconnected machines (e.g., multiple servers configured in a cluster). Although two computing devices 105, 110 are shown, any suitable number of computing devices may be utilized in the transactions described herein. The computing devices 105, 110 may be implemented by a common organization or by different organizations. Referring to the travel booking example, computing device 105 may be implemented by a travel agent or customer using a travel application while computing device 110 may be implemented by an airline or a hotel chain.

Computing devices 105, 110 may execute respective operating systems (OSs) 121, 123. Any suitable operating system(s) may be used including, for example, any suitable LINUX operating system (e.g., available from RED HAT, INC.), any suitable WINDOWS operating system available from MICROSOFT CORPORATION, any suitable UNIX operating system, any suitable OS operating system available from APPLE, INC., any suitable ANDROID operating system available from GOOGLE, any suitable iOS operating system available from APPLE INC., etc. The operating systems 121, 123 may manage execution of the various other components at the computing devices 105. In some examples, the operating systems 121, 123 may facilitate communication between the components and system hardware, such as data stores 122, 128. In an example embodiment, computing device 105 may include a processor (e.g., CPU 180) and a memory (e.g., memory device 182). Additionally, computing device 110 may include a processor (e.g., CPU 184) and a memory (e.g., memory device 186). In some examples, computing devices 105, 110 include and/or are in communication with one or more data stores 122, 128. Data stores 122, 128 may be organized according to a file system 126, 127 that may be in communication with the operating system 121, 123. In some examples, data stores 122, 128 are organized according to and/or include any suitable database, and/or other data storage arrangement. Data stores 122, 128 may be internal to computing devices 105, 110, or external and connected to computing device 105, 110 either directly or via a network, such as the network 155. In some examples, data stores 122 may include transaction resources, such as 106a-n described above, that may be manipulated during transactions. In some examples, the system 200 may also include the certificate authority 117 in communication with the various other components via the network 155. The certificate authority 117 may store associations between parties (e.g., transaction clients, transaction managers, resource managers, etc.) and public keys associated with a public/private key pair.

The computing devices 105, 110, and the certificate authority 117 may be in communication with one another via a network 155. The network 155 may be any suitable wired and/or wireless network and may include, for example, one or more local area networks (LANs), one or more wide area networks (WANs), one or more public networks such as the Internet, etc. The network 155 may carry communications between components such as resource manager 115, resource manager 125A, resource manager 125B, transaction manage 120A, and transaction manager 120B (e.g., components not executing on the same computing device). In some examples, transactions may be executed without using the network 155. For example, the computing system 200 may be implemented on a single computing device 105 or 110. Also, for example, the computing devices 105, 110 may be directly connected to one another.

In the example of FIG. 2, the computing device 105 includes resource managers 115, 125A, a first transaction manager 120A, and a transaction client 112. The computing device 110 includes a resource manager 125B and a transaction manager 120B. The resource managers 115, 125A, 125B may be or include any suitable component of the computing system 200 that is configured to manage resources (e.g., resources stored at the data stores 122, 128). Resource managers 115, 125A, 125B may be executed by one or both of the computing devices 105, 110 to manage one or more system resources such as, for example, persistent and stable storage systems such as the data stores 122, 128. The resource managers 115, 125A, 125B may include any manager configured to manage a storage system including, for example, a file manager, a database, a messaging service, etc. Examples of resource managers include relational databases, an executive information system (EN), a Java Message Service (JMS) provider configured to manage transactional message delivery, etc.

The transaction managers 120A-B may be executed at one or both of the computing devices 105, 110 and are programmed to coordinate transactions by coordinating multiple participating resource managers (e.g., resource managers 115, 125A-B). The participating resource managers may include, other transaction managers 120A-B, or local resource managers 115 and 125A-B. In some examples, transaction managers 120A-B may take part in transactions as a participating resource manager when a transaction can be broken into constituent transactions. The transaction manager 120A may be configured as a master transaction manager and may instruct one or more of the resource managers 115, 125A, 125B to perform one or more operations on resources to implement the transaction. Additionally, the transaction manager 120A may instruct the transaction manager 120B to coordinate a second transaction that is a constituent of the first transaction. Accordingly, the transaction manager 120B may instruct one or more of the resource managers 115, 125A, 125B regarding operations according to the second transaction.

The transaction client 112 may be an application that requests a transaction (e.g., a non-repudiable compensating transaction). For example, in a compensating transaction, such as the business travel example, a transaction client 112 may be an application at a computing device of the employer that requests the business travel transaction and the resource managers 115, 125A, 125B may be responsible for booking flights, trains, hotels, seminars, etc. Additionally, in an example embodiment, the employer may also use the protocol for paycheck processing for its employees in a distributed transaction. For example, the transaction client 112 may be an application at a computing device of the employer that requests the paycheck processing transaction. In a long-running transaction that spans a long period of time, it may be advantageous to avoid locks on non-local resources when transactions require user input. For example, referring to the travel booking example, a transaction client 112 may be an application associated with a travel agent, an Internet-provided application with which a user can initiate a reservation request, flights, events, etc. with several different resource managers 115, 125A, 125B. A transaction manager such as 120A-B may establish a new transaction upon receiving a request from a transaction client 112 to perform the transaction. The transaction client 112 may be co-located with the first transaction manager 120 (as shown), or may be located on a remote machine (e.g., on computing device 110).

As used herein, a physical processor or a processor 180, 184 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 182, 186 refers to a volatile or non-volatile memory device, such as RAM, ROM, EEPROM, or any other device capable of storing data. Processors 180, 184 may be interconnected using a variety of techniques, ranging from a point-to-point processor interconnect, to a system area network, such as an Ethernet-based network.

Figure 3:
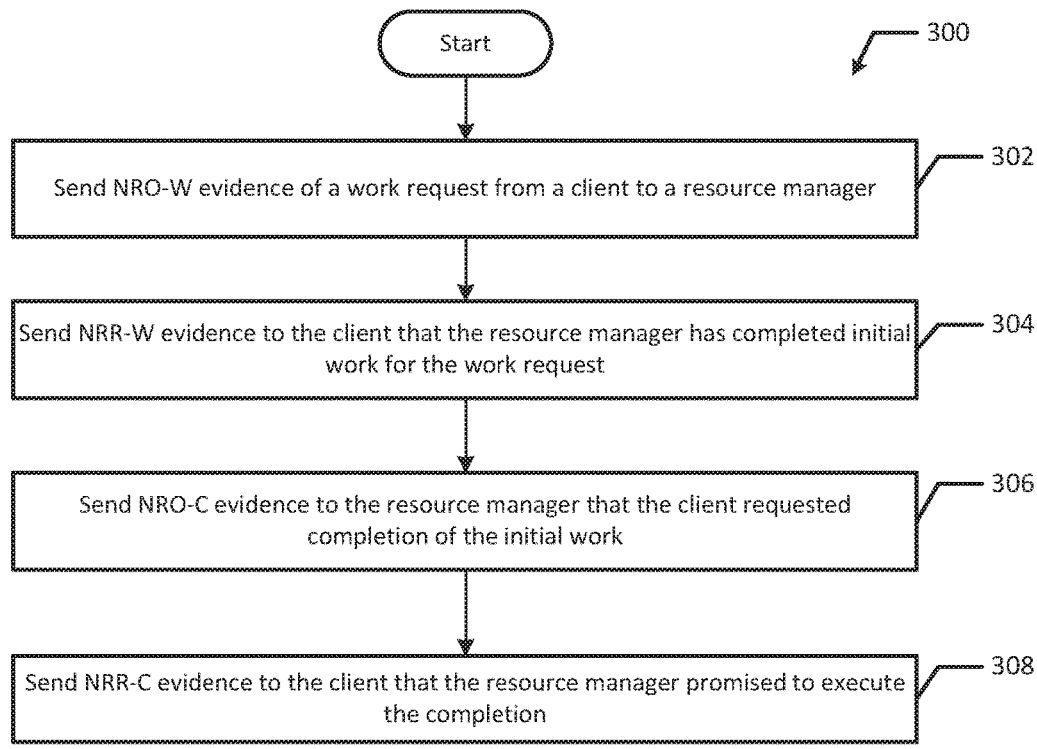
FIG. 3 illustrates a flowchart of an example process for executing a non-repudiable transaction according to an example embodiment of the present disclosure.

FIG. 3 illustrates a flowchart of an example process for executing a non-repudiable transaction according to an example embodiment of the present disclosure. Although the example method 300 is described with reference to the flowchart illustrated in FIG. 3 it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both.

In the illustrated embodiment, a transaction manager (e.g., transaction manager 120A-B, hereinafter transaction manager 120) may send non-repudiation of origin-work (NRO-W) evidence of a work request from a client to a resource manager (block 302). In an example embodiment, client 112 may generate a non-repudiation of origin or transaction origin token to be included with a work request, which may be used as the NRO-W evidence. For example, the client 112 may create the NRO-W token or the transaction origin token by digitally signing transaction origin data with a private key of the client 112. Transaction origin data may include, for example, any suitable description of the transaction. The description may include a letter, number, or alphanumeric identifier of the transaction and/or any description of the transaction. In some examples, the transaction origin data may also include a linkage ID, such as a random number (e.g., a true random number or pseudorandom number). The client 112, for example, may generate the linkage ID (e.g., random number) in any suitable manner. In addition to being included in the transaction origin data, the linkage ID (e.g., random number) may be provided to the transaction manager 120 as part of the transaction request message and used later in the transaction, as described herein. In some examples, the linkage ID (e.g., random number) may be known only to the client 112, which may generate the linkage ID (e.g., random number), and to the transaction manager 120, which receives the linkage ID (e.g., random number) with the transaction origin data in the transaction request message. The transaction manager 120 may receive and log the transaction origin token. For example, the transaction manager 120 may write a copy of the transaction origin token to the transaction log 190. In some examples, the transaction manager 120 may create a timestamp for the transaction origin token at the transaction log 190. The timestamp may indicate a time that the transaction origin token was transmitted by the client 112, or an approximation of that time. For example, the timestamp may indicate the time that the transaction origin token was received by the transaction manager 120 or may indicate a time that the transaction origin token was logged to the transaction log 190. In some examples, the transaction manager 120 may also log other information included with the transaction request message such as, for example, the linkage ID (e.g., random number). In an example embodiment, the transaction manager 120 may create a transaction submission token. The transaction manager 120 may create the transaction submission token, for example, by encrypting a description of the transaction with the private key of the transaction manager 120. In some examples, the description of the transaction may be the same description that the client 112 encrypted to create the transaction origin token. The transaction submission token may be written to the log 190 (e.g., with a timestamp) and sent to the client 112 in a transaction submission message. The client 112 may receive the transaction submission message and transaction submission token from the transaction manager 120. To the client 112, the transaction submission token may serve as proof that the client 112 sent the request and that the request was received by the transaction manager 120.

Then, the transaction manager 120 may send non-repudiation of receipt-work (NRR-W) evidence to the client 112 that the resource manager (e.g., resource manager 115, 125A-B) has completed initial work for the work request (block 304). In an example embodiment, the transaction manager 120 my request that one or more resource managers (e.g., resource manager 115, 125A-B) perform initial work after receiving a work request. The transaction manager 120 may send a digest message including a digest of an initial work item to the resource manager (e.g., resource manager 115, 125A-B). The initial work item may be a component of the transaction to be executed by the resource manager (e.g., resource manager 115, 125A-B). For example, the work item may include a series of actions that the resource manager (e.g., resource manager 115, 125A-B) may perform. The digest of the work item may be created from a description of the work item. The digest may be identifiable with the work item, but may not be decipherable to the resource manager (e.g., resource manager 115, 125A-B). For example, the transaction manager 120 may create the digest by taking a cryptographic hash of the description of the work item. In this way, a party in possession of the work item description (e.g., the transaction manager 120 or a party having access to the log 190) may verify that the digest refers to the work item by re-hashing the work item and comparing the results to the digest. In some examples, the transaction manager 120 may digitally sign the digest with its private key. In some examples, the initial work may be visible to other transactions requested by the same client 112 or different clients.

The resource manager (e.g., resource manager 115, 125A-B) may receive the digest. In response, the resource manager (e.g., resource manager 115, 125A-B) may generate a non-repudiation of receipt (NRR-W token) or work item receipt token and send to the transaction manager 120 a message including the work item receipt token. The resource manager (e.g., resource manager 115, 125A-B) may create the work item receipt token, for example, by digitally signing the digest with its (the resource manager's) private key. The transaction manager 120 may receive and log the work item receipt token for example, with a timestamp indicating the time of creation and/or receipt of the work item receipt token. Upon receiving and logging the work item receipt token, the transaction manager 120 may send to the resource manager (e.g., resource manager 115, 125A-B) a work message including the description of the work item in a format decipherable to the resource manager (e.g., resource manager 115, 125A-B). For example, the description of the work item may clear without requiring additional processing or the resource manager (e.g., resource manager 115, 125A-B) may include an appropriate cryptographic key or keys to decrypt the message.

Optionally, the work message may also include a copy of the transaction origin token generated by the client 112. In this way, the resource manager (e.g., resource manager 115, 125A-B) may be provided with proof that the transaction associated with the work item was requested by the client 112. If a dispute arises as to the authenticity of the transaction origin token, the transaction log 190 and/or the certificate authority 117 may be consulted. For example, if the transaction origin token is time stamped at the transaction log 190 during a time when the certificate authority 117 had a valid association between the client 112 and the public key that can decrypt the transaction origin token, then the client 112 may be prevented from repudiating the transaction request. Also optionally, the transaction manger 120 may send to the client 112 a work item receipt message including a copy of the work item receipt token generated by the resource manager (e.g., resource manager 115, 125A-B). The client 112 may receive the work item receipt token message. The work item receipt token, in conjunction with the timestamp generated by the transaction manager 120 at the transaction log 190, may serve as proof that the resource manager (e.g., resource manager 115, 125A-B) received the work item, thus preventing the resource manager (e.g., resource manager 115, 125A-B) from later claiming otherwise. Because the transaction manager 120 acts as a trusted third party, the resource manager (e.g., resource manager 115, 125A-B) may be willing to generate the work item receipt token confirming receipt of the work item before it actually receives the work item and/or the associated transaction origin token (NRO-W token).

The transaction manager 120 may send non-repudiation of origin-completion (NRO-C) evidence to the resource manager that the client requested completion of the work (block 306). In an example embodiment, the client 112 may confirm whether to complete the transaction by sending NRO-C evidence to the transaction manager 120. For example, the transaction manager 120, after enrolling one or more resource managers (e.g., resource manager 115, 125A-B) as described, may not complete the transaction until the client 112 requests completion. Requesting completion of the transaction may include creating a non-repudiation of completion or completion token. The completion token may be created, for example, by digitally signing with the client's private key an indication of that the client 112 requests completion of the transaction. The completion token may be included in a completion token message directed to the transaction manager 120. The transaction manager 120 may receive the completion token message and log the message (e.g., with a timestamp) at the transaction log 190. In some examples, the transaction manager 120 may generate non-repudiation of confirmation receipt or confirmation receipt token and transmit it back to the client 112. Having the confirmation receipt may allow the client 112 to prove that the transaction manager 120 received the completion token.

In an example embodiment, the client 112 may generate a non-repudiation of completion or completion token by digitally signing, with its private key, an instruction to complete the transaction. The completion token may be distinct from the completion token described above with respect to the transaction manager 120. For example, the completion token generated by the transaction manager 120 may be a digitally signed indication of a completion instruction, while the completion token generated bye the client 112 may be a digitally signed indication of a completion instruction. The client 112 may send a completion message including the completion token to the transaction manager 120, which may receive the message and log the completion token (e.g., with timestamp). The transaction manager 120 may provide the completion token to the resource manager (e.g., resource manager 115, 125A-B) in a completion message. The resource manager (e.g., resource manager 115, 125A-B) may receive the completion message. The completion token may provide the resource manager (e.g., resource manager 115, 125A-B) with proof that completion of the transaction was requested by the client 112. The resource manager (e.g., resource manager 115, 125A-B) may complete the work indicated during execution of the transaction. Optionally, the transaction manager 120 may query the resource manager (e.g., resource manager 115, 125A-B) for a confirmation completion token that may be used to prove that the resource manager (e.g., resource manager 115, 125A-B) received and acted on the completion message.

Then, the transaction manager 120 may send non-repudiation of receipt-completion (NRR-C) evidence to the client that the resource manager promised to execute the completion (block 308). The transaction manager 120 may send the resource manager (e.g., resource manager 115, 125A-B) an instruction to complete the transaction (e.g., complete the initial work). In response, the resource manager (e.g., resource manager 115, 125A-13) may complete the initial work item on the one or more resources (e.g., resources 106a-n). Before, during, or after executing the initial work, the resource manager (e.g., resource manager 115, 125A-B) may create and send a completion receipt token. The completion receipt token may be created by digitally signing data describing the completion instruction with the private key of the resource manager (e.g., resource manager 115, 125A-B). The completion receipt token may be sent to the transaction manager 120 in a completion message. In some examples, the transaction manager 120 may respond to the completion message by sending the resource manager (e.g., resource manager 115, 125A-B) the linkage ID (e.g., random number) received from the client 112 and described above. For example, the resource manager (e.g., resource manager 115, 125A-B) may use the linkage ID (e.g., random number) as proof that the transaction manager 120 accepted the completion receipt token. The transaction manager 120 may receive and log the completion receipt token (e.g., with a timestamp). Optionally, the transaction manager 120 may provide the completion receipt token to the client 112 as proof that the resource manager (e.g., resource manager 115, 125A-B) promised to complete the transaction.

In an example embodiment, the transaction manager 120 may determine whether all resource managers (e.g., resource manager 115, 125A-B) taking part in the transaction have returned completion receipt tokens or otherwise promised to complete the transaction. If yes, the transaction manager 120 may send a completion request to the resource manager (e.g., resource manager 115, 125A-B). The completion request may include an instruction to complete the transaction and, in some examples, may include the completion token generated by the client 112. The resource manager (e.g., resource manager 115, 125A-B) may receive the completion request and complete the transaction.

In an example embodiment, if one or more of the resource managers (e.g., resource manager 115, 125A-B) does not send back a completion receipt token or otherwise indicates an inability to complete the transaction, then the transaction may not be able to proceed according to the protocol and the work request (e.g., the transaction initiated by the client) may not be completed. If all of the resource managers (e.g., resource manager 115, 125A-13) are able to and promise to complete the initial work, the transaction manager 120 may generate and log (e.g., with timestamp), a TM completion token. The transaction manager 120 may create the TM completion token by digitally signing an instruction to complete the transaction with the transaction manager's private key. The transaction manager 120 may send the TM completion token to the resource manager (e.g., resource manager 115, 125A-B) in a TM completion message. Upon receiving the TM completion message, the resource manager (e.g., resource manager 115, 125A-B) may complete the work item. The TM completion messages may provide the resource manager (e.g., resource manager 115, 125A-B) with proof that it was asked to complete the transaction from the transaction manager 120. Optionally, the transaction manager 120 may also provide a TM completion message including the TM completion token to the client 112, which may receive the same.

In various examples, as described, additional resource managers (e.g., resource manager 115A-N and 125A-13) may take part in the transaction. In some examples, one or more resource managers (e.g., resource manager 115, 125A-B) may take part in the transaction, hut not in a non-repudiable manner (e.g., non-verified resource managers). For example, non-verified resource managers may not be asked to generate non-repudiation tokens 180 and may not be provided with non-repudiation tokens 160, 170. Instead, non-verified resource mangers may receive instructions from the transaction manager 120 according to a standard protocol such as an atomic commit protocol. For example, instead of sending a digest of an assigned work item and requesting a work item receipt token, the transaction manager 120 may send non-verified resource managers the full description of the work item. Also, the transaction managers (e.g., transaction managers 120A-B) may not receive tokens from non-verified resource managers but may instead receive a message indicating that the non-verified resource manager has not successfully completed the initial work. Similarly, the transaction manager may send a non-verified resource manager an instruction to complete without an accompanying token. Non-verified resource managers may be used for any suitable purpose. For example, if a resource manager (e.g., resource manager 115A-N and 125A-B) is implemented by the same enterprise as the client 112, then there may not be as acute a need for one party to prove its state relative to the other.

The method 300 described above advantageously allows the transaction to span a relatively long period of time. Unlike other transactions that result in all-or-nothing outcomes where the client 112 may be unaware of whether a resource manager (e.g., resource manager 115A-N and 125A-B) has provided NRR-W evidence, in the protocol described herein, both the client 112 and the resource manager (e.g., resource manager 115A-N and 125A-B) receive non-repudiation evidence (e.g., NRO-W evidence, NRR-W evidence. NRO-C evidence, and NRR-C evidence) as the protocol progresses, which advantageously provides the resource manager with proof of requests and changes made to resources before the protocol completes. For example, the client 112 may receive the NRR-W evidence prior to the completion of the transaction. Additionally, the resource manager (e.g., resource manager 115A-N and 125A-B) may receive NRO-W evidence as soon as the resource manager provides the NRR-W evidence to the transaction manager 120. Providing evidence, as the protocol progresses, advantageously allows the client 112 to utilize additional resources and resource managers (e.g., resource manager 115A-N and 125A-B) if the NRR-W evidence and/or NRR-C evidence are not received, in order to complete the transaction. Conversely, transactions that result in all-or-nothing outcomes may result in an uncompleted transaction if all of the resource managers are unable to complete their associated initial work assignments.

Figure 4A:
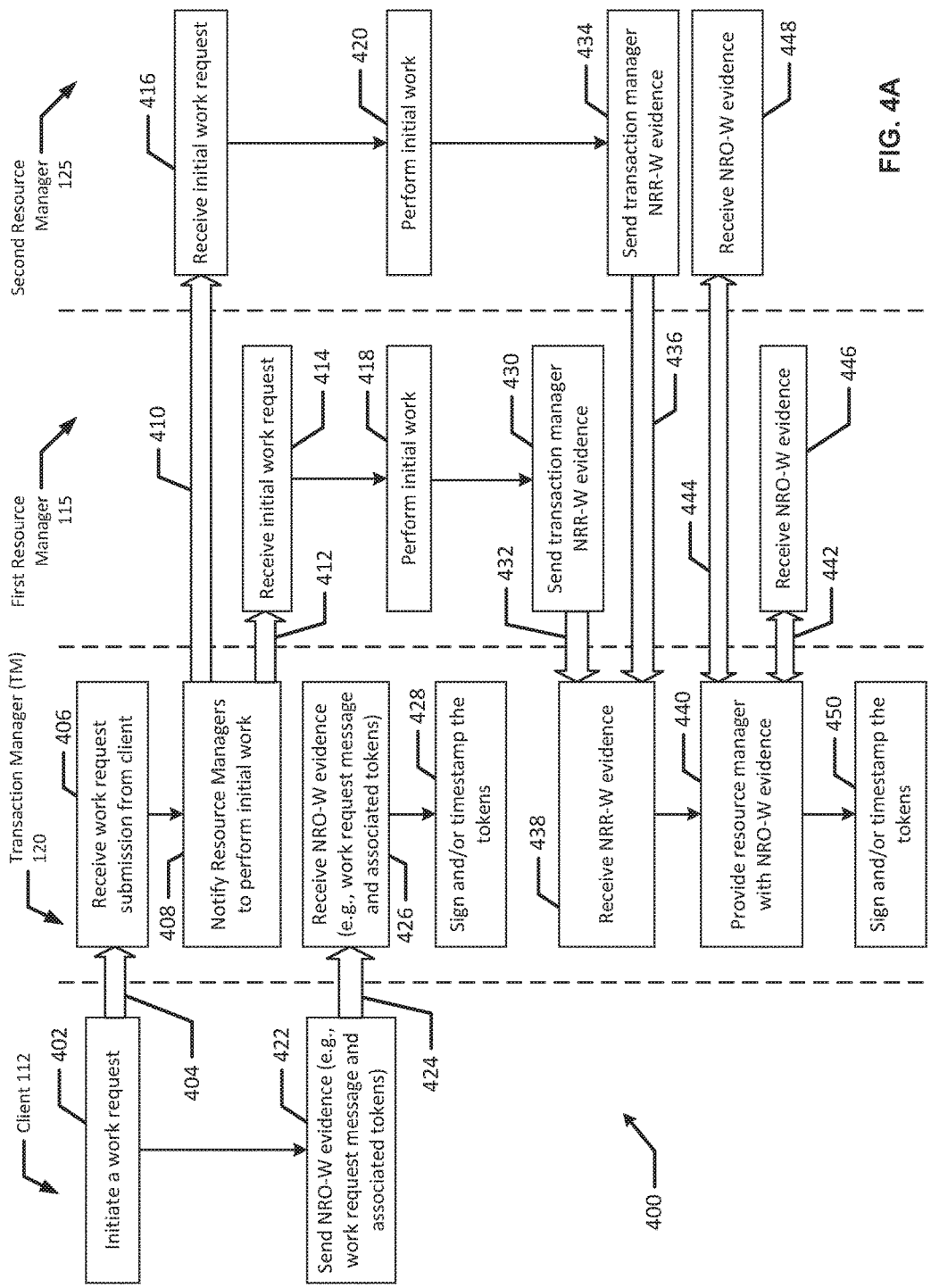
FIGS. 4A and 4B illustrate a flow diagram of an example process for executing a non-repudiable transaction according to an example embodiment of the present disclosure.
Figure 4B:
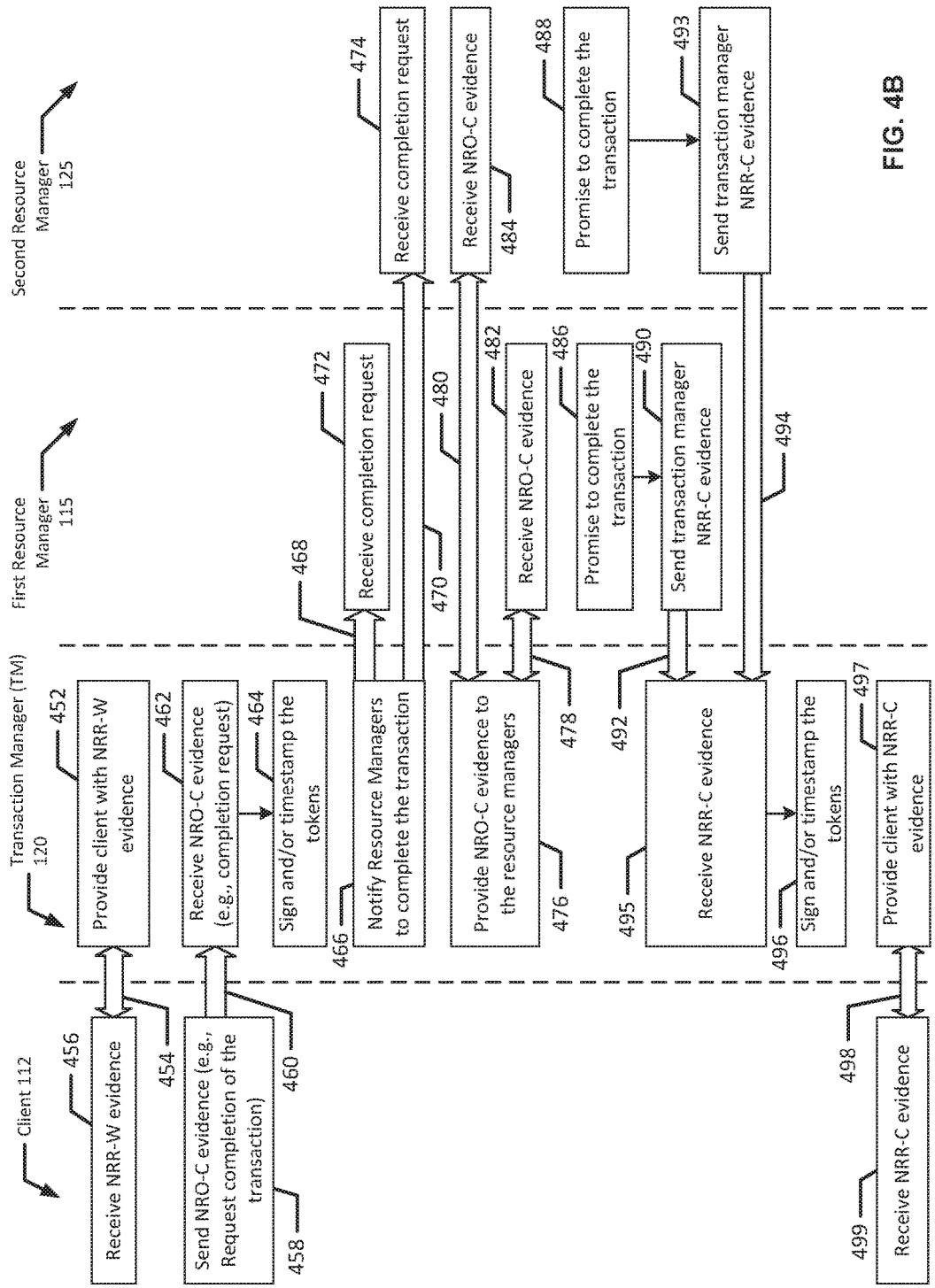

FIGS. 4A and 4B illustrate a flow diagram of an example process for executing a non-repudiable transaction according to an example embodiment of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, and some of the blocks described are optional. The method may be performed by processing logic that may include (e.g., circuitry, dedicated logic, etc.), software, or a combination of both.

In the illustrated example embodiment, a client 112 may initiate a work request (blocks 402 and 404). The work request may be associated with various types of transactions including a compensating transaction, a distributed transaction, a long-running transaction, a saga transaction, or a combination of several different types of transactions. For example, the client 112 such as a travel application may initiate a work request to book a flight and a hotel. The client 112 may also initiate a work request to book multiple flights and multiple hotels, train tickets, dining reservations, shows, events, etc. for an entire itinerary. Then, a transaction manager (e.g., transaction manager 120A-B, hereinafter transaction manager 120) may receive the work request submission from the client 112 (block 406). Then, the transaction manager 120 may notify resource managers (e.g., resource manager 115, 125A-B) to perform initial work (blocks 408 to 412). For example, the transaction manager 120 may notify a first resource manager 115 to perform first initial work related to the work request (e.g., book a flight). Additionally, the transaction manager 120 may notify a second resource manager (e.g., resource manager 125A-B, hereinafter resource manager 125) to perform second initial work related to the work request (e.g., book a hotel). The first resource manager 115 may receive the first initial work request (block 414). For example, the first resource manager 115 may receive a first initial work request to book a specific flight on a specific date. In response to the transaction manager 120 notifying the second resource manager 125 to perform second initial work, the second resource manager 125 receives the second initial work request (block 416). For example, the second resource manager 125 may receive a second initial work request to book a specific hotel on a specific date. Then, the first resource manager 115 may perform the first initial work (e.g., temporarily book the flight) (block 418). Additionally, the second resource manager may perform the second initial work (e.g., temporarily book the hotel) (block 420). For example, the first resource manager 115 and the second resource manager 125 may hold reservations for a certain period of time (e.g., one hour, three days, etc.), such that the items appear to be booked (e.g., are visible) to other resource managers and/or other clients. In some examples, the protocol described herein may run for many days, in which case the client 112 and resource managers 115, 125 both have evidence for changes that have been made public (e.g., are visible) before the protocol completes.

After initiating a work request, the client 112 may send NRO-W evidence such as a work request message and associated tokens to the transaction manager 120 (blocks 422 and 424). In an example embodiment, the work request message may include various data including, for example, a description of the requested transaction (e.g., dates, price ranges, geographical information, airline and hotel information, etc.). For example, the client 112 may generate a non-repudiation of origin (NRO-W token) or transaction origin token to be included in the work request. The client 112, or an associated party, may create the transaction origin token, for example, by digitally signing transaction origin data with the private key of the client 112. Transaction origin data may include, for example, any suitable description of the transaction. The description may include a letter, number, or alphanumeric identifier of the transaction and/or any description of the transaction. In some examples, the transaction origin data may also include a random number (e.g., a true random number or pseudorandom number). The client 112, for example, may generate the random number in any suitable manner. In addition to being included in the transaction origin data, the random number may provided to the transaction manager 120 as part of the transaction request message and used later in the transaction. In some examples, the random number may be known only to the client 112, which may generate the random number, and to the transaction manager 120, which receives the random number with the transaction origin data in the transaction request message. The client 112 may digitally sign the transaction origin data (e.g., with the client's private key) to generate the transaction origin token. In some examples, the transaction request message is the transaction origin token. Then, the transaction manager 120 may receive the NRO-W evidence (e.g., the work request message and associated tokens) (block 426). In an example embodiment, the transaction manager 120 may receive and log the transaction origin token that is associated with the work request message. Additionally, the transaction manager 120 may decrypt the transaction origin token with the client's public key, revealing the transaction origin data. For example, the transaction manager 120 may write a copy of the transaction origin token to the transaction log 190. The transaction manager 120 may sign and/or timestamp the tokens (block 428). In an example embodiment, the transaction manager 120 may create a timestamp for the transaction origin token at the transaction log 190. The timestamp may indicate a time that the transaction origin token was transmitted by the client 112, or an approximation of that time. For example, the timestamp may indicate the time that the transaction origin token was received by the transaction manager 120, a time that the transaction origin token was logged to the transaction log 190, etc. In some examples, the transaction manager 120 may also log other information included the work request, such as, for example, the random number.

After performing the first initial work (e.g., temporarily booking the flight), the first resource manager 115 may send the transaction manager 120 first non-repudiation of receipt-work (NRR-W) evidence (blocks 430 and 432). In an example embodiment, the first resource manager 115 may generate a non-repudiation of receipt or a first work item receipt token and send to the transaction manager 120 a message including the work item receipt token. The first resource manager 115 may create the first work item receipt token, for example, by digitally signing a work digest with the first resource manager's private key. Additionally, after performing the second initial work (e.g., temporarily booking the hotel), the second resource manager 125 may send the transaction manager 120 second NRR-W evidence (blocks 434 and 436). In an example embodiment, the second resource manager 125 may generate a non-repudiation of receipt or a second work item receipt token and send to the transaction manager 120 a message including the work item receipt token. The second resource manager 125 may create the second work item receipt token, for example, by digitally signing a work digest with the second resource manager's private key. Then, the transaction manager 120 may receive the first NRR-W evidence from the first resource manager 115 and the second NRR-W evidence from the second resource manager 125 (block 438). In an example embodiment, the transaction manger 120 may receive and log the work item receipt tokens from the first resource manager 115 and the second resource manager 125.

After receiving the NRR-W evidence, the transaction manager 120 may provide the first resource manager 115 and the second resource manager 125 with the NRO-W evidence (blocks 440 to 444). In an example embodiment, the transaction manager 120 may send the first resource manager 115 and the second resource manager 125 the signed and/or timestamped transaction origin token (e.g., NRO-W evidence). Optionally, the transaction manager may send a copy of the transaction origin token generated by the client 112. Then, the first resource manager 115 may receive the NRO-W evidence (block 446). In an example embodiment, the NRO-W evidence may be directly sent to the resource managers and/or the NRO-W evidence may be made available to the resource managers (e.g., first resource manager 115 and second resource manager 125). Additionally, the second resource manager 125 may receive the NRO-W evidence (block 448). In an example embodiment, the NRO-W evidence may be sent to the first resource manager 115 and the second resource manager 125 simultaneously. In another example embodiment, the NRO-W evidence may be sent to the first resource manager 115 and the second resource manager 125 at different times. For example, the second resource manager 125 may be provided with proof that the transaction associated with the work item was requested by the client 112. If a dispute arises as to the authenticity of the transaction origin token, the transaction log 190 and/or the certificate authority 117 may be consulted.

After receiving the NRR-W evidence, the transaction manager 120 may sign and/or timestamp tokens associated with the NRR-W evidence (block 450). In an example embodiment, the transaction manager 120 may create a timestamp for the work item receipt token (NRR-W token) at the transaction log 190. The timestamp may indicate a time that the work item receipt token was transmitted by the first resource manager 115 and/or the second resource manager 125, or an approximation of that time. For example, the timestamp may indicate the time that the work item receipt token was received by the transaction manager 120, a time that the work item receipt token was logged to the transaction log 190, etc. Additionally, the timestamp may indicate an approximation of the time that may have varying degrees of accuracy depending on the transaction (e.g., accuracy of a second, 5 seconds, a minute, etc.). In some examples, the transaction manager 120 may also log other information such as, for example, the linkage ID. Then, the transaction manager 120 may provide the client 112 with the NRR-W evidence (blocks 452 and 454). By providing the client 112 with the NRR-W evidence prior to the completion of the transaction, the client 112 has proof that the resource manager received the work request. For example, if the client 112 does not receive the NRR-W evidence from the transaction manager, the client 112 may conclude that the first resource manager 115 and/or second resource manager 125 never received the work request or perhaps that the first resource manager 115 and/or second resource manager 125 are not functioning properly (e.g., unable to send or receive evidence), which advantageously allows the client 112 to engage additional resource managers to complete the initial work items associated with the transaction and thereby reducing downtime in completing the transaction. In an example embodiment, the transaction manager 120 may send the client 112 a work item receipt message including a copy of the work item receipt token generated by the first resource manager 115 and the second resource manager 125. The work item receipt token, in conjunction with the timestamp generated by the transaction manager 120 at the transaction log 190, may serve as proof that the first resource manager 115 and second resource manager 125 received the work item, thus preventing the resource managers 115, 125 from later claiming otherwise. The client 112 may receive the NRR-W evidence (block 456). In an example embodiment, the NRR-W evidence may be directly sent to the client 112 and/or the NRR-W evidence may be made available to the client 112.

The client 112 may send NRO-C evidence (e.g., request completion of the transaction) (blocks 458 and 460). For example, the transaction manager 120 may enroll one or more resource managers (e.g., first resource manager 115 and second resource manager 125) to perform initial work for the transaction, but the first resource manager 115 and the second resource manager 125 may not finalize the initial work until the client 112 requests completion of the transaction. For example, the travel application may provide the client 112 with prices for the hotel and flight information that were temporarily booked based on the work request and then the client 112 may confirm wither to complete the transaction. In response to the client 112 requesting completion of the transaction, the transaction manager 120 may receive the NRO-C evidence (e.g., receive the completion request) (block 462). In an example embodiment, confirming completion of the transaction may include creating a non-repudiation of completion or completion token. The completion token may be included in a completion request directed to the transaction manager 120. In an example embodiment, the completion token may be created, for example, by digitally signing with the client's private key an indication that the client 112 confirms completion of the transaction. Then, the transaction manager 120 may sign and/or timestamp the tokens associated with the completion request (block 464). In some examples, the transaction manager 120 may receive the completion request and log the message (e.g., with a signature and a timestamp) at the transaction log 190. Additionally, the transaction manager 120 may generate non-repudiation of completion receipt or a completion receipt token and transmit it back to the client 112. This may allow the client 112 to prove that the transaction manger 120 received the completion token.

After receiving the completion request, the transaction manager 120 may notify the first resource manager 115 and the second resource manager 125 to complete the transaction (blocks 466 to 470). In an example embodiment, the transaction manager 120 may notify the first resource manager 115 and the second resource manager 125 to complete the transaction by sending a completion instruction. The completion instruction may instruct the resource manager to finalize the initial work item on one or more resources (e.g., resources 106a-n). The first resource manager 115 may receive the completion request (block 472) and the second resource manager 125 may receive the completion request (block 474). In an example embodiment, the completion request may be a general request to complete the transaction, for example, such that the first resource manager 115 and the second resource manager 125 receive the same completion request. In another example embodiment, the first resource manager 115 may receive a first completion request for the first initial work (e.g., finalize flight reservation) and the second resource manager 125 may receive a second completion request for the second initial work finalize hotel reservation). The transaction manager 120 may provide non-repudiation of origin-completion (NRO-C) evidence to the first resource manager 115 and the second resource manager 125 (blocks 476 to 480). For example, the transaction manager 120 may send the completion tokens to the first resource manager 115 and the second resource manager 125. Then, the first resource manager 115 may receive the NRO-C evidence (block 482) and the second resource manager 125 may receive the NRO-C evidence (block 484). In an example embodiment, the first resource manager 115 may receive the same NRO-C evidence as the second resource manager 125. In another example embodiment, the first resource manager 115 may receive first NRO-C evidence, such as a first completion token and the second resource manager 125 may receive second NRO-C evidence, such as a second completion token. In response to receiving the NRO-C evidence, the first resource manager 115 may promise to complete the transaction (block 486). Additionally, the second resource manager 125 may promise to complete the transaction (block 488). For example, the first resource manager 115 may promise to book the flight and the second resource manager 125 may promise to book the hotel.

After promising to complete the transactions, the first resource manager 115 and the second resource manager 125 may send non-repudiation of receipt-completion (NRR-C) evidence to the transaction manager 120 (blocks 490 to 494). In an example embodiment, the first resource manager 115 and the second resource manager 25 may send completion receipt tokens or otherwise promise to complete the transaction. In response to the resource managers (e.g., first resource manager 115 and second resource manager 125) sending the NRR-C evidence, the transaction manager 120 receives the NRR-C evidence (block 495). In an example embodiment, the transaction manager 120 may receive the completion receipt tokens from the first resource manager 115 and the second resource manager 125. Then, the transaction manager 120 signs and/or timestamps the tokens associated with the NRR-C evidence (block 496). In some examples, the transaction manager 120 may receive the completion receipt tokens and log the tokens (e.g., with a signature and a timestamp) at the transaction log 190. Additionally, the transaction manager 120 may generate a receipt token and transmit it back to the first resource manager 115 and/or the second resource manager 125. This may allow the first resource manager 115 and/or the second resource manager 125 to prove that the transaction manger 120 received the completion receipt token. The transaction manager 120 may provide the client 112 with the NRR-C evidence (blocks 497 and 498). In an example embodiment, the transaction manager 120 may provide the client 112 with the NRR-C evidence after it has determined whether all the resource managers taking part in the transaction (e.g., first resource manager 115 and second resource manager 125) have returned completion receipt tokens. For example, the work request may include multiple flights and hotel reservations that span over a long period of time (e.g., multiple days, weeks, etc.). In another example embodiment, the transaction manger 120 may provide the client 112 with NRR-C evidence as it is received from each resource manager. For example, the transaction manager 120 may provide the client 112 with first NRR-C evidence from the first resource manager 115 as soon as the flight is booked and then send second NRR-C evidence from the second resource manager 125 as soon as the hotel is reserved. Then, the client 112 may receive the NRR-C evidence (block 499). The NRO-W evidence, the NRR-W evidence, the NRO-C evidence, and the NRR-C evidence are exchanged between the client 112, transaction manager 120, and resource managers (e.g., first resource manager 115 and second resource manager 125) to prevent either one of the client 112 and the resource managers (e.g., first resource manager 115 and second resource manager 125) from gaining an advantage.

Figure 5A:
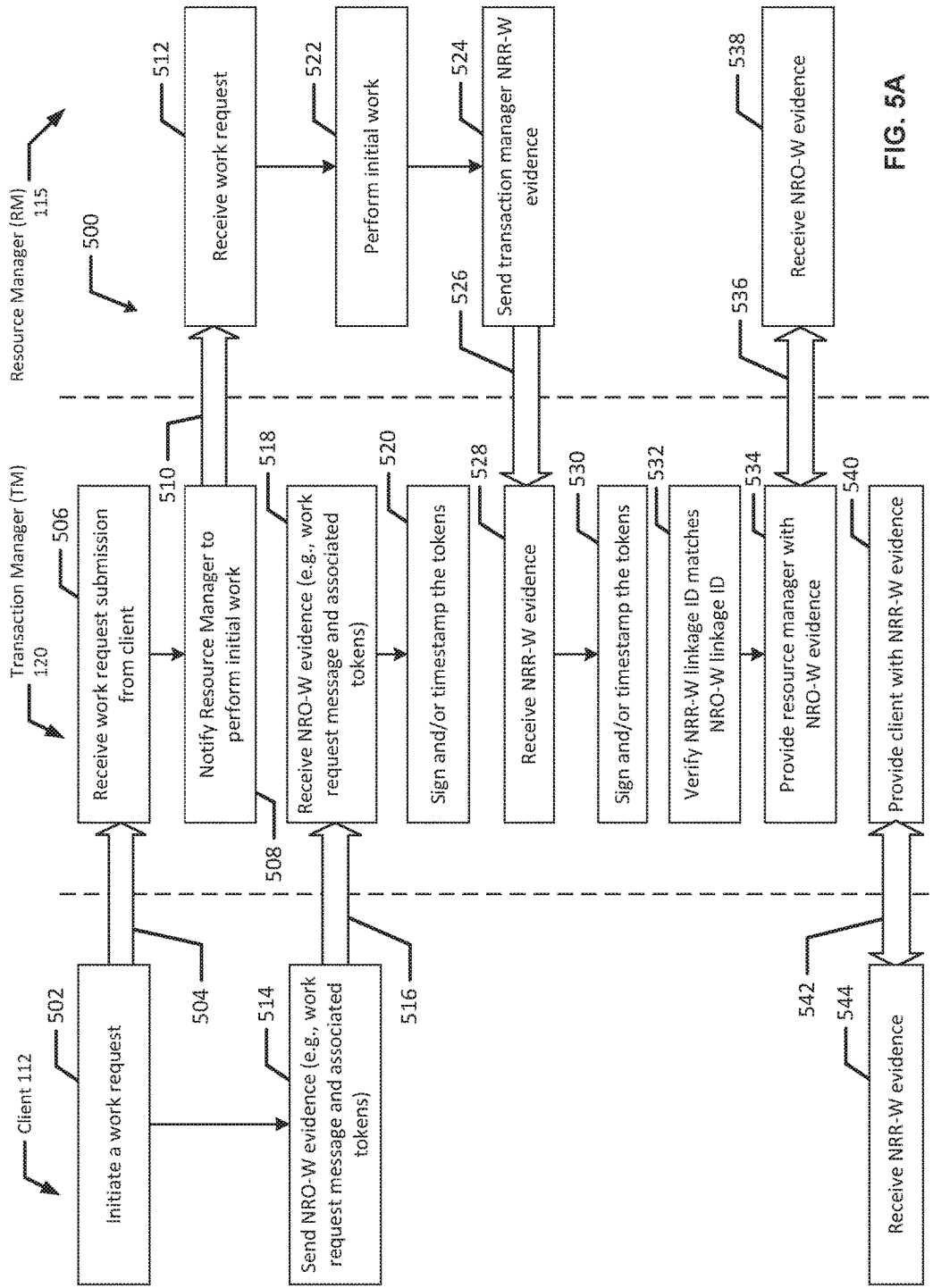
FIGS. 5A and 5B illustrate a flow diagram of an example process for executing a non-repudiable transaction according to an example embodiment of the present disclosure.
Figure 5B:
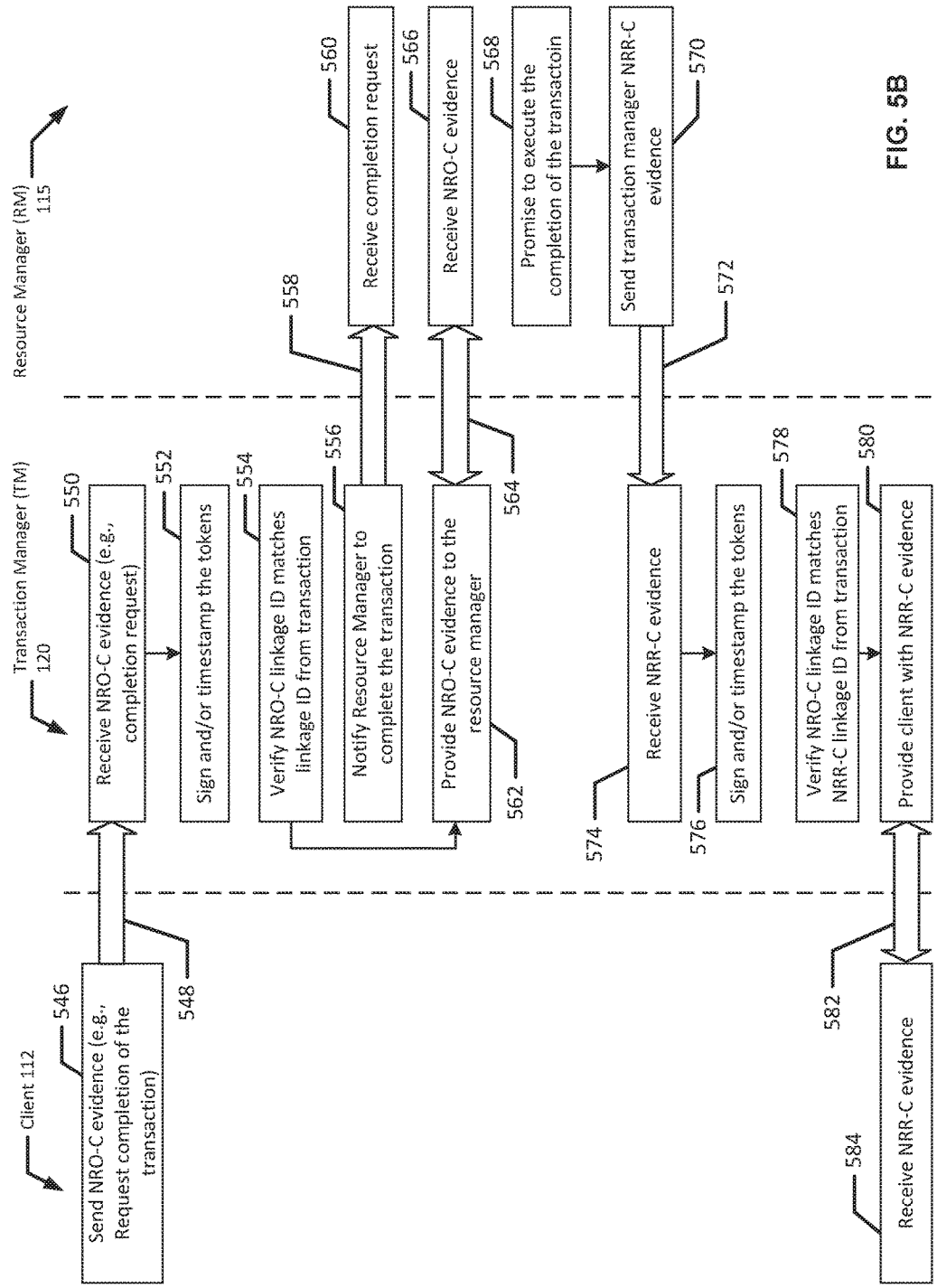

FIGS. 5A and 5B illustrate a flow diagram of an example process for executing a non-repudiable transaction according to an example embodiment of the present disclosure. Although the example method 500 is described with reference to the flow diagram illustrated in FIGS. 5A and 5B, it will be appreciated that many other methods of performing the acts associated with the method may be used. For example, the order of some of the blocks may be changed, certain blocks may be combined with other blocks, and some of the blocks described are optional. The method may be performed by processing logic that may include (e.g., circuitry, dedicated logic, etc.), software, or a combination of both.

In the illustrated example embodiment, the client 112 may initiate a work request (blocks 502 and 504). For example, the client 112 may communicate with a transaction manager 120 to perform a work request associated with a transaction. In an example embodiment, the client 112 may generate a linkage ID associated with the transaction. The linkage ID may be any unique identifier such as a token, a random number, text string, etc. In another example embodiment, the trusted third party or transaction manager 120 may generate the linkage ID after the client 112 initiates the work request to avoid the client generating a linkage ID that is already used by the transaction manager 120 for another work request. For example, the transaction manager 120 may reject a work request that uses a duplicate linkage ID of a different work request that is ongoing. In an example embodiment, the linkage ID may be used to prove that each of the NRO-W evidence, the NRR-W evidence, the NRO-C evidence, and the NRR-C evidence relate to a specific protocol run. Additionally, the linkage ID may provide verification that the client 112 that requested the initial work also requested completion of the same initial work. Then, the transaction manager 120 may receive the work request submission from the client 112 (block 506). For example, the client 112 may send a message detailing the work request to the transaction manager 120. After receiving a work request submission, the transaction manager 120 may notify the resource manager 115 to perform initial work (blocks 508 and 510). In an example embodiment, the transaction manager 120 may forward the work request submission to the resource manager 115. In another example embodiment, the transaction manager 120 may determine what initial work is needed from the work request and may notify the appropriate resource manager 115 to perform the initial work. Then, the resource manager 115 may receive the work request (block 512). The resource manager 115 may receive the same work request submission that was sent to the transaction manager 120 or may receive a work request that is specific to the resource manager 115 (e.g., contains information specific to the work to be undertaken by the resource manager 115). The client 112 may send NRO-W evidence (e.g., send a work request message and any associated tokens such as NRO-W tokens or transaction origin tokens) to the transaction manager 120 (blocks 514 and 516). In an example embodiment, the client 112 may separately send a work request message and any associated tokens to provide evidence (e.g., NRO-W evidence) that the client 112 was the originator of the work request. In another example embodiment, the work request message and associated tokens may accompany the original work request submission from the client 112. Responsive to the client 112 sending the NRO-W evidence (e.g., the work request message and associated tokens), the transaction manager 120 may receive the NRO-W evidence (e.g., the work request message and associated tokens) (block 518). Then, the transaction manager 120 may sign and/or timestamp the tokens (block 520). For example, the transaction manager 120 may add a timestamp to the tokens and may sign the work request message. Additionally, the transaction manager may sign the timestamped tokens.

After the resource manager 115 receives the work request, the resource manager 115 may perform initial work (block 522). For example, the resource manager 115 may perform initial work related to the transaction without fully committing to the transaction (e.g., reserving a flight or a hotel). In an example embodiment, changes made to resources by the resource manager are made visible to other resource managers, hereby advantageously allowing multiple resource managers to use the visible information to proceed with their respective initial work items without having to wait for any specific initial work items to fully finalize. Then, the resource manager 115 may send the transaction manager 120 NRR-W evidence (blocks 524 and 526). For example, the resource manager 115 may send evidence to acknowledge that it received the work request. In an example embodiment, the resource manager 115 may send the NRR-W evidence to the transaction manager after receiving the work request, but before the client 112 sends the NRO-W evidence. The resource manager 115 may send the NRR-W evidence before receiving NRO-W evidence because the transaction manager 120 is a trusted third party, and may not release the NRR-W evidence until the NRO-C evidence is also received. In response to the resource manager 115 sending the NRR-W evidence, the transaction manager 120 may receive the NRR-W evidence (block 528). In an example embodiment, the NRR-W evidence may be associated with the linkage ID. Then, the transaction manager may sign and/or timestamp tokens (e.g., NRR-W or work item receipt tokens) associated with the NRR-W evidence (block 530). For example, the transaction manager 120 may add a timestamp to the tokens and may sign any associated work receipt message. Additionally, the transaction manager may sign the timestamped tokens. The transaction manager may also verify the NRR-W linkage ID matches the NRO-W linkage ID (block 532). For example, the transaction manager 120 may verify that the linkage ID associated with the transaction and the NRR-W evidence as well as the NRO-W evidence match. In an example embodiment, if the NRR-W linkage ID matches the NRO-W linkage ID, the transaction manager 120 may establish that the NRO-W evidence and the NRR-W evidence are associated with the same transaction, and can proceed with the transaction. If the linkage IDs do not match, the transaction manager 120 may reject or deny the evidence and put the transaction on hold until the proper evidence with matching linkage IDs is received. In an example embodiment, the transaction manager 120 may send messages to the client 112 and/or the resource manager 115 indicating that the linkage IDs do not match. After confirming the linkage IDs match, the transaction manager 120 may provide the resource manager 115 with the NRO-W evidence (blocks 534 and 536). In an example embodiment, the transaction manager 120 may send the NRO-W evidence to the resource manager 115. In another example embodiment, the transaction manager 120 may make the NRO-W evidence available to the client in a database that the resource manager 115 has access to. For example, the transaction manager 120 may provide the resource manager with a code to retrieve the NRO-W evidence from the database. Then, the resource manager 115 may receive the NRO-W evidence (block 538).

After receiving the NRR-W evidence and verifying that the linkage IDs match, the transaction manager may provide the client 112 with the NRR-W evidence (blocks 540 and 542). In an example embodiment, the transaction manager may provide the NRR-W evidence to the client 112 immediately after providing the NRO-W evidence to the resource manager 115. In another example embodiment, the transaction manager 120 may provide the NRR-W evidence to the client 112 and the NRO-W evidence to the resource manager simultaneously. Then, the client 112 may receive the NRR-W evidence (block 544). After receiving the NRR-W evidence, the client 112 may request completion of the transaction by sending NRO-C evidence (blocks 546 and 548). Responsive to the client 112 sending NRO-C evidence (e.g., requesting completion of the transaction), the transaction manager 120 receives the NRO-C evidence (e.g., completion request) (block 550). In an example embodiment, the completion request and associated tokens (e.g., NRO-C tokens or completion tokens) may include an NRO-C linkage ID. Then the transaction manger 120 may sign and/or timestamp the tokens associated with the NRO-C evidence (block 552). For example, the transaction manager 120 may add a timestamp to the tokens and may sign any associated completion request message. Additionally, the transaction manager may sign the timestamped tokens. The transaction manager 120 may verify that the NRO-C linkage matches the linkage ID from the transaction (block 554). For example, the transaction manager 120 may verify that the linkage ID associated with the transaction and the NRO-C evidence match. In an example embodiment, if the NRO-C linkage ID matches the transaction linkage ID, the transaction manager 120 may establish that the NRO-C associated with the same transaction requested by the client 112. The transaction manager 120 may notify the resource manager 115 to complete the transaction (blocks 556 and 558). For example, after verifying that the linkage IDs match, the transaction manager 120 may instruct the resource manager 115 to complete the transaction (e.g., book the flight). Then, the resource manager 115 may receive the completion request (block 560).

After the transaction manager 120 verifies that the NRO-C linkage ID matches the linkage II) from the transaction, the transaction manager 120 may provide the NRO-C evidence to the resource manager 115 (blocks 562 and 564). In an example embodiment, the transaction manager 120 may send the NRO-C evidence to the resource manager 115. In another example embodiment, the transaction manager 120 may give the resource manager 115 access to the NRO-C evidence. Additionally, the transaction manager 120 may provide the NRO-C evidence along with the completion request. Responsive to the transaction manager 120 providing the NRO-C evidence, the resource manager 115 may receive the NRO-C evidence (block 566). For example, the resource manager 115 may directly receive the NRO-C evidence or may receive a code to access the NRO-C evidence. Then, the resource manager 115 may promise to execute the completion of the transaction (block 568). The resource manager 115 may send NRR-C evidence to the transaction manager 120 (blocks 570 and 572). In an example embodiment, the NRR-C evidence may be accompanied by an NRR-C linkage ID. Responsive to the resource manager 115 sending the NRR-C evidence, the transaction manager 120 may receive the NRR-C evidence (block 574). Then, the transaction manager 120 may sign and/or timestamp the tokens (e.g., NRR-C tokens or completion receipt tokens) associated with the NRR-C evidence (block 576). For example, the transaction manager 120 may add a timestamp to the tokens and may sign any associated receipt message. Additionally, the transaction manager may sign the timestamped tokens. Then, the transaction manager may verify that the NRO-C linkage ID matches the NRR-C linkage ID from the transaction (block 578). For example, the transaction manager 120 may verify that the NRO-C evidence and the NRR-C evidence are associated with the same transaction. After verifying that the linkage IDs match, the transaction manager 120 may provide the client 112 with the NRR-C evidence (blocks 580 and 582). Then, the client 112 may receive the NRR-C evidence (block 584). In an example embodiment, the transaction manager 120 may provide the NRR-C evidence to the client immediately after providing the NRO-C evidence to the resource manager 115. In another example embodiment, the transaction manager 120 may provide the NRR-C evidence to the client 112 and the NRO-C evidence to the resource manager 115 simultaneously. The NRO-W evidence, the NRR-W evidence, the NRO-C evidence, and the NRR-C evidence are exchanged between the client 112, transaction manager 120, and resource manager 115 to prevent either one of the client 112 and the resource manager 115 from gaining an advantage.

By exchanging the NRO-W evidence, the NRR-W evidence, the NRO-C evidence, and the NRR-C evidence between the client 112, transaction manager 120, and resource manager 115, each party is advantageously held accountable for the work items they request and/or process. For example, if the client 112 provides NRO-W evidence and NRO-C evidence to the transaction manager 120 for booking a flight, which is sent to the resource manager 115, the resource manager 115 will not be responsible for the flight if the client 112 later decides to back out of the transaction. Additionally, if the resource manager 115 sends NRR-W evidence and NRR-C evidence that the flight reservation is completed to the transaction manager 120, which is sent to the client 112, the client 112 can proceed with confidence that the flight reservation has been made and/or may request compensation if for some reason the reservation was not made by the resource manager 115 or the reservation cannot be fulfilled.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
at least one processor in communication with the memory;
an operating system (OS) executing on the at least one processor;
at least one resource manager configured to manage a storage system; and
a transaction manager, wherein the transaction manager is configured to:
provide non-repudiation of origin-work (NRO-W) evidence of a work request from a client to the at least one resource manager, wherein
the transaction manager receives the work request from the client, and
the NRO-W evidence is provided to the resource manager immediately after non-repudiation of receipt-work (NRR-W) evidence is provided to the transaction manager,
provide the NRR-W evidence to the client that the at least one resource manager has completed initial work for the work request,
provide non-repudiation of origin-completion (NRO-C) evidence to the at least one resource manager that the client requested completion of the initial work, and
provide non-repudiation of receipt-completion (NRR-C) evidence to the client that the at least one resource manager promised to execute the completion, wherein each of the NRO-W evidence, the NRR-W evidence, the NRO-C evidence, and the NRR-C evidence are exchanged to prevent either one of the client and the resource manager from gaining an advantage.

2. The system of claim 1, wherein the work request is related to a compensating transaction and the initial work is visible to a second transaction.

3. The system of claim 1, wherein the transaction manager sends the NRR-W evidence to the client immediately after the resource manager completes the initial work.

4. The system of claim 1, wherein each of the NRO-W evidence, the NRR-W evidence, the NRO-C evidence, and the NRR-C evidence includes a linkage ID, wherein the linkage ID is used to:
prove that each of the NRO-W evidence, the NRR-W evidence, the NRO-C evidence, and the NRR-C evidence relate to a specific protocol run; and
provide verification that the client that requested completion of the initial work also sent the work request.

5. The system of claim 4, wherein the linkage ID is generated by the client, and the linkage ID is a unique identifier.

6. A computer-implemented method for coordinating a transaction by a transaction manager executed by at least one processor, the method comprising:
providing, by the transaction manager, non-repudiation of origin-work (NRO-W) evidence of a work request from a client to a resource manager, wherein
the transaction manager receives the work request from the client, and
the NRO-W evidence is provided to the resource manager immediately after non-repudiation of receipt-work (NRR-W) evidence is provided to the transaction manager;
providing, by the transaction manager, the NRR-W evidence to the client that the resource manager has completed initial work for the work request;
providing, by the transaction manager, non-repudiation of origin-completion (NRO-C) evidence to the resource manager that the client requested completion of the initial work; and
providing, by the transaction manager, non-repudiation of receipt-completion (NRR-C) evidence to the client that the resource manager promised to execute the completion, wherein each of the NRO-W evidence, the NRR-W evidence, the NRO-C evidence, and the NRR-C evidence are exchanged to prevent either one of the client and the resource manager from gaining an advantage.

7. The method of claim 6, further comprising:
providing, by the transaction manager, second NRO-W evidence of a second work request from the client to a second resource manager, wherein
the transaction manager receives the second work request from the client, and
the second NRO-W evidence is provided to the resource manager immediately after second NRR-W evidence is provided to the transaction manager;
providing, by the transaction manager, the second NRR-W evidence to the client that the second resource manager has completed second initial work for the second work request;
providing, by the transaction manager, second NRO-C evidence to the second resource manager that the client requested completion of the second initial work; and
providing, by the transaction manager, second NRR-C evidence to the client that the second resource manager promised to execute the completion of the second initial work, wherein each of the second NRO-W evidence, the second NRR-W evidence, the second NRO-C evidence, and the second NRR-C evidence are exchanged to prevent either one of the client and the resource manager from gaining an advantage.

8. The method of claim 7, further comprising determining, by the transaction manager, that the resource manager and the second resource manager taking part in the transaction have successfully completed the initial work and second initial work before sending a completion instruction to the resource manager.

9. The method of claim 6, wherein the work request is related to a compensating transaction and the initial work is visible to a second transaction.

10. The method of claim 6, wherein the transaction manager sends the NRR-W evidence to the client immediately after the resource manager completes the initial work.

11. The method of claim 6, wherein each of the NRO-W evidence, the NRR-W evidence, the NRO-C evidence, and the NRR-C evidence includes a linkage ID, and the linkage ID is used to:
prove that each of the NRO-W evidence, the NRR-W evidence, the NRO-C evidence, and the NRR-C evidence relate to a specific protocol run; and
provide verification that the client that requested completion of the initial work also sent the work request.

12. The method of claim 11, wherein the linkage ID is generated by the transaction manager.

13. The method of claim 6, further comprising:
adding, by the transaction manager, a first timestamp to a transaction origin token; and
signing, by the transaction manager, the transaction origin token before providing the NRO-W evidence to the resource manager, wherein the work request includes a description of the work and the transaction origin token digitally signed with a private key of the client.

14. The method of claim 13, further comprising:
adding, by the transaction manager, a second timestamp to a work item receipt token; and
signing, by the transaction manager, the work item receipt token before providing the NRR-W evidence to the client, wherein the transaction manager receives the work item receipt token digitally signed with a private key from the resource manager.

15. The method of claim 14, further comprising:
adding, by the transaction manager, a third timestamp to a completion token; and
signing, by the transaction manager, the completion token before providing the NRO-C evidence to the resource manager, wherein the transaction manager receives a commit instruction and a completion token digitally signed with the private key of the client.

16. The method of claim 15, further comprising:
adding, by the transaction manager, a fourth timestamp to a completion receipt token; and
signing, by the transaction manager, the completion receipt token before providing the NRR-C evidence to the client, wherein the transaction manager receives the completion receipt token digitally signed with the private key of the resource manager.

17. The method of claim 16, further comprising:
writing, by the transaction manager, the transaction origin token to a transaction log;
writing, by the transaction manager, the work item receipt token to the transaction log;
writing, by the transaction manager, the completion token to the transaction log; and
writing, by the transaction manager, the completion receipt token to the transaction log.

18. The method of claim 16, wherein
the first timestamp indicates when the transaction origin token was transmitted to the transaction manager by the client,
the second timestamp indicates when the work item receipt token was transmitted to the transaction manager by the resource manager,
the third timestamp indicates when the completion token was transmitted to the transaction manager by the client, and
the fourth timestamp indicates when the completion receipt token was transmitted to the transaction manager by the resource manager.

19. A non-transitory machine readable medium storing a program, which when executed by a processors, causes a transaction manager to:
provide non-repudiation of origin-work (NRO-W) evidence of a work request from a client to the at least one resource manager, wherein
the transaction manager receives the work request from the client, and
the NRO-W evidence is provided to the resource manager immediately after non-repudiation of receipt-work (NRR-W) evidence is provided to the transaction manager;
provide the NRR-W evidence to the client that the at least one resource manager has completed initial work for the work request,
provide non-repudiation of origin-completion (NRO-C) evidence to the at least one resource manager that the client requested completion of the initial work, and
provide non-repudiation of receipt-completion (NRR-C) evidence to the client that the at least one resource manager promised to execute the completion, wherein each of the NRO-W evidence, the NRR-W evidence, the NRO-C evidence, and the NRR-C evidence are exchanged to prevent either one of the client and the resource manager from gaining an advantage.

20. The non-transitory machine readable medium of claim 19, which when executed by a processor, causes the transaction manager to:
provide second NRO-W evidence of a second work request from the client to a second resource manager, wherein the transaction manager receives the second work request from the client, and the second NRO-W evidence is provided to the resource manager immediately after second NRR-W evidence is provided to the transaction manager;

provide the second NRR-W evidence to the client that the second resource manager has completed second initial work for the second work request;

provide second NRO-C evidence to the second resource manager that the client requested completion of the second initial work; and provide second NRR-C evidence to the client that the second resource manager promised to execute the completion of the second initial work, wherein each of the second NRO-W evidence, the second NRR-W evidence, the second NRO-C evidence, and the second NRR-C evidence are exchanged to prevent either one of the client and the resource manager from gaining an advantage.

* * * * *

UNITED STATES PATENT AND TRADEMARK OFFICE
CERTIFICATE OF CORRECTION

PATENT NO. : 10,228,967 B2
APPLICATION NO. : 15/170407
DATED : March 12, 2019
INVENTOR(S) : Robinson et al.

Page 1 of 1

It is certified that error appears in the above-identified patent and that said Letters Patent is hereby corrected as shown below:

In the Specification

In Column 3, Line 62, replace "(TPP)" with --(TTP)--;

In Column 4, Line 17, replace "(TIP)" with --(TTP)--;

In Column 6, Line 27, replace "manage 120A" with --manager 120A--;

In Column 6, Line 50, replace "(EN)" with --(EIS)--;

In Column 11, Line 2, replace "125A-13" with --125A-B--;

In Column 11, Line 45, replace "125A-13" with --125A-B--;

In Column 11, Line 64, replace "125A-13" with --125A-B--;

In Column 11, Line 67, replace "hut" with --but--;

In Column 16, Line 52, after "work" insert --(e.g.,--;

In Column 20, Line 16, after "NRO-C linkage" insert --ID--;

In Column 20, Line 31, replace "II)" with --ID--.

Signed and Sealed this
Twenty-eighth Day of May, 2019

Andrei Iancu
*Director of the United States Patent and Trademark Office*